(12) United States Patent
Kwag et al.

(10) Patent No.: US 9,246,156 B2
(45) Date of Patent: Jan. 26, 2016

(54) WATERPROOF BATTERY PACK

(75) Inventors: Nohyun Kwag, Yongin-si (KR);
Sungchae Hyun, Yongin-si (KR);
Sanghoon Lee, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 1259 days.

(21) Appl. No.: 13/112,981

(22) Filed: May 20, 2011

(65) Prior Publication Data

US 2012/0121938 A1    May 17, 2012

(30) Foreign Application Priority Data

Nov. 17, 2010   (KR) ........................ 10-2010-0114370

(51) Int. Cl.
*H01M 2/00* (2006.01)
*H01M 2/16* (2006.01)
*H01M 2/34* (2006.01)
*H01M 2/10* (2006.01)

(52) U.S. Cl.
CPC .............. *H01M 2/34* (2013.01); *H01M 2/1077* (2013.01)

(58) Field of Classification Search
None
See application file for complete search history.

(56) References Cited

U.S. PATENT DOCUMENTS

| 2003/0096160 A1* | 5/2003 | Sugiura et al. ............... 429/120 |
| 2009/0253027 A1* | 10/2009 | Yang et al. ................... 429/61 |

FOREIGN PATENT DOCUMENTS

| JP | 11-099974 A | 4/1999 |
| JP | 2000-188091 A | 7/2000 |
| JP | 2001-006650 A | 1/2001 |
| JP | 2001-130477 A | 5/2001 |
| JP | 2007-200580 A | 8/2007 |
| KR | 20-2000-0009769 U | 6/2000 |
| KR | 20-0388816 Y1 | 6/2005 |
| KR | 10-2007-0108800 A | 11/2007 |
| KR | 10-2007-0110567 A | 11/2007 |

OTHER PUBLICATIONS

Korean Notice of Allowance dated Oct. 31, 2012 for Korean Patent Application No. KR 10-2010-0114370 which corresponds to captioned U.S. Appl. No. 13/112,981.
Korean Office Action dated Apr. 13, 2012 for Korean Patent Application No. KR 10-2010-0114370 which corresponds to captioned U.S. Appl. No. 13/112,981.

* cited by examiner

*Primary Examiner* — Barbara Gilliam
*Assistant Examiner* — Adam A Arciero
(74) *Attorney, Agent, or Firm* — Knobbe, Martens, Olson & Bear, LLP

(57) ABSTRACT

A battery pack for an electric bicycle is disclosed. In one embodiment, the battery pack includes i) a lower case having a top, a bottom and an interior space formed between the top and bottom and ii) a battery cell placed in the interior space of the lower case, wherein the battery cell has first and second surfaces opposing each other, and wherein the first surface of the battery cell is closer to the bottom of the lower case than the second surface of the battery cell. The battery pack may further include i) a protection circuit board mounted on the second surface of the battery cell and placed in the interior space of the lower case, ii) an upper case formed over the top of the lower case and iii) a separator case formed between the protection circuit board and the upper case.

17 Claims, 5 Drawing Sheets

WATERPROOF BATTERY PACK

CROSS-REFERENCE TO RELATED PATENT APPLICATION

This application claims the benefit of Korean Patent Application No. 10-2010-0114370, filed on Nov. 17, 2010, in the Korean Intellectual Property Office, the disclosure of which is incorporated herein in its entirety by reference.

BACKGROUND

1. Field

The described technology generally relates to a waterproof battery pack.

2. Description of the Related Technology

A battery pack used in an electric bicycle (e-bike) is frequently exposed to moisture in its use. To deal with moisture penetration, a gasket is typically interposed between battery pack cases. However, where a battery pack is exposed to water for a long period of time, the water frequently penetrates into the interior of the battery through the gasket or the space between the gasket and battery pack cases.

SUMMARY OF CERTAIN INVENTIVE ASPECTS

One inventive aspect is a battery pack capable of preventing water from penetrates into the interior thereof even when it is exposed to moisture for a long period of time.

Another aspect is a battery pack which includes a lower case, a battery cell accommodated in the interior of the lower case, a protection circuit board mounted on the top of the battery cell and accommodated in the interior of the lower case, an upper case formed on the top of the lower case, and a separator case formed between the protection circuit board and the upper case.

The separator case may include a separator for separating the lower and upper cases from each other, a waterproof layer formed on a top of the separator, and a separator extending portion formed to be extended in the direction of the lower case from the separator.

The separator may further include a first reinforcing waterproof layer formed inward from the waterproof layer on the top thereof. The distance between the waterproof layer and the first reinforcing layer may be identical to the thickness of a third outer wall that constitutes an upper case sidewall.

A second reinforcing waterproof layer may be formed inward from the separator extending portion on a bottom of the separator. The distance between the separator extending portion and the second reinforcing waterproof layer may be identical to the thickness of a lower case sidewall, which constitutes the lower case.

A discharge groove may be formed at one short side of the separator.

A first stepped portion that has a step difference formed higher than the top of the separator and is formed along a long side of the top of the separator may be formed on the top of the separator. A second stepped portion having a step difference formed higher than the top of the first stepped portion may be formed at the other end of one short side of the first stepped portion. A void space may be formed at a lower portion of the first and second stepped portions, and a hole may be formed in a top of the second stepped portion.

A first stepped portion that has a step difference formed higher than the top of the separator and may be formed along a long side of the top of the separator is formed on the top of the separator, and a discharge passage may be formed between the first reinforcing waterproof layer and one long side of the first stepped portion.

The separator extending portion may form a step difference with an outer surface of the lower case sidewall due to the thickness thereof.

The upper case sidewall that constitutes the upper case may include a first outer wall and second and third outer walls formed at a lower portion of the first outer wall. An outer surface of the second outer wall may be formed to be protruded outward from an outer surface of the first outer wall, and an inclined surface is formed on an outer wall surface connected to the second outer wall from the first outer wall. The outer surface of the second wall may be formed to be protruded outward from an outer surface of the separator so that a step difference is formed at a boundary between the outer surface of the second outer wall and the outer surface of the separator.

The separator case may be formed of a material with elasticity. Another aspect is a battery pack comprising: a lower case having a top, a bottom and an interior space formed between the top and bottom; a battery cell placed in the interior space of the lower case, wherein the battery cell has first and second surfaces opposing each other, and wherein the first surface of the battery cell is closer to the bottom of the lower case than the second surface of the battery cell; a protection circuit board mounted on the second surface of the battery cell and placed in the interior space of the lower case; an upper case formed over the top of the lower case; and a separator case formed between the protection circuit board and the upper case.

In the above battery pack, the separator case comprises i) a separator configured to separate the lower and upper cases from each other, wherein the separator has first and second surfaces opposing each other, and wherein the first surface of the separator is closer to the bottom of the lower case than the second surface of the separator, ii) a waterproof layer extending from the second surface of the separator toward the upper case, and iii) a separator extending portion extending from the first surface of the separator toward the lower case.

In the above battery pack, the separator case has a center portion, wherein the separator further comprises a first reinforcing waterproof layer extending from the second surface of the separator toward the upper case, and wherein the first reinforcing waterproof layer is closer to the center portion of the separator case than the waterproof layer. In the above battery pack, the upper case has a sidewall, wherein a portion of the sidewall is interposed between the waterproof layer and the first reinforcing layer. The above battery pack further comprises a second reinforcing waterproof layer extending from the first surface of the separator toward the lower case. In the above battery pack, the lower case has a sidewall, wherein the sidewall of the lower case is interposed between the separator extending portion and the second reinforcing waterproof layer. In the above battery pack, the separator has two short sides and two long sides, wherein the upper case has a top and a bottom which is closer to the lower case than the top of the upper case, and wherein a discharge groove is formed at one of the short sides of the separator.

The above battery pack further comprises a first stepped portion which is closer to the top of the upper case than the second surface of the separator and is formed along at least one of the long sides of the separator. The above battery pack further comprising a second stepped portion which is closer to the top of the upper case than the first stepped portion and is formed at the short side of the separator. In the above battery pack, each of the first and second stepped portions has a top and a bottom which is farther from the upper case than the top of each of the stepped portions, and wherein an empty space is formed on the bottoms of the first and second stepped portions.

In the above battery pack, each of the first and second stepped portions has a top and a bottom which is farther from the upper case than the top of each of the stepped portions, and wherein a hole is formed in the top of the second stepped portion. In the above battery pack, the first stepped portion has two short sides and two long sides, and wherein a discharge passage formed between the first reinforcing waterproof layer and at least one of the long sides of the first stepped portion. In the above battery pack, the upper case comprises i) a first sidewall and ii) second and third sidewalls formed at a lower portion of the first outer wall.

In the above battery pack, an outer surface of the second sidewall protrudes outwardly and downwardly from an outer surface of the first sidewall so that the protruding portion is inclined with respect to the first sidewall. In the above battery pack, the separator case comprises a separator configured to separate the lower and upper cases from each other, and wherein an outer surface of the second sidewall protrudes outwardly from an outer surface of the separator. In the above battery pack, the second and third sidewalls contact the separator.

In the above battery pack, the separator case is formed at least partially of an elastic material.

Another aspect is a battery pack comprising: a lower case having a top, a bottom and an interior space formed between the top and bottom; a battery cell placed in the interior space of the lower case; a protection circuit board mounted on the second surface of the battery cell and placed in the interior space of the lower case; an upper case formed over the top of the lower case; and a separator configured to separate the lower and upper cases, wherein the separator is closer to the upper case than the protection circuit board.

In the above battery pack, the separator has first and second surfaces opposing each other, wherein the first surface of the separator is closer to the bottom of the lower case than the second surface of the separator, and wherein the battery pack further comprises i) a waterproof layer extending from the second surface of the separator toward the upper case and ii) a separator extending portion extending from the first surface of the separator toward the lower case.

Another aspect is a battery pack comprising: a lower case having a sidewall; a battery cell placed in the lower case; an upper case formed over the lower case and having a sidewall; a separator configured to separate the lower and upper cases, wherein the separator has first and second surfaces opposing each other, wherein the second surface of the separator is closer to the upper case than the first surface, and wherein i) at least part of the upper case sidewall and ii) at least part of the lower case sidewall contact the second surface of the separator; and a waterproof layer extending from the second surface of the separator toward the upper case and at least partially surrounding the upper case sidewall.

DETAILED DESCRIPTION OF CERTAIN INVENTIVE EMBODIMENTS

Embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the disclosure to those skilled in the art.

Figure 1:
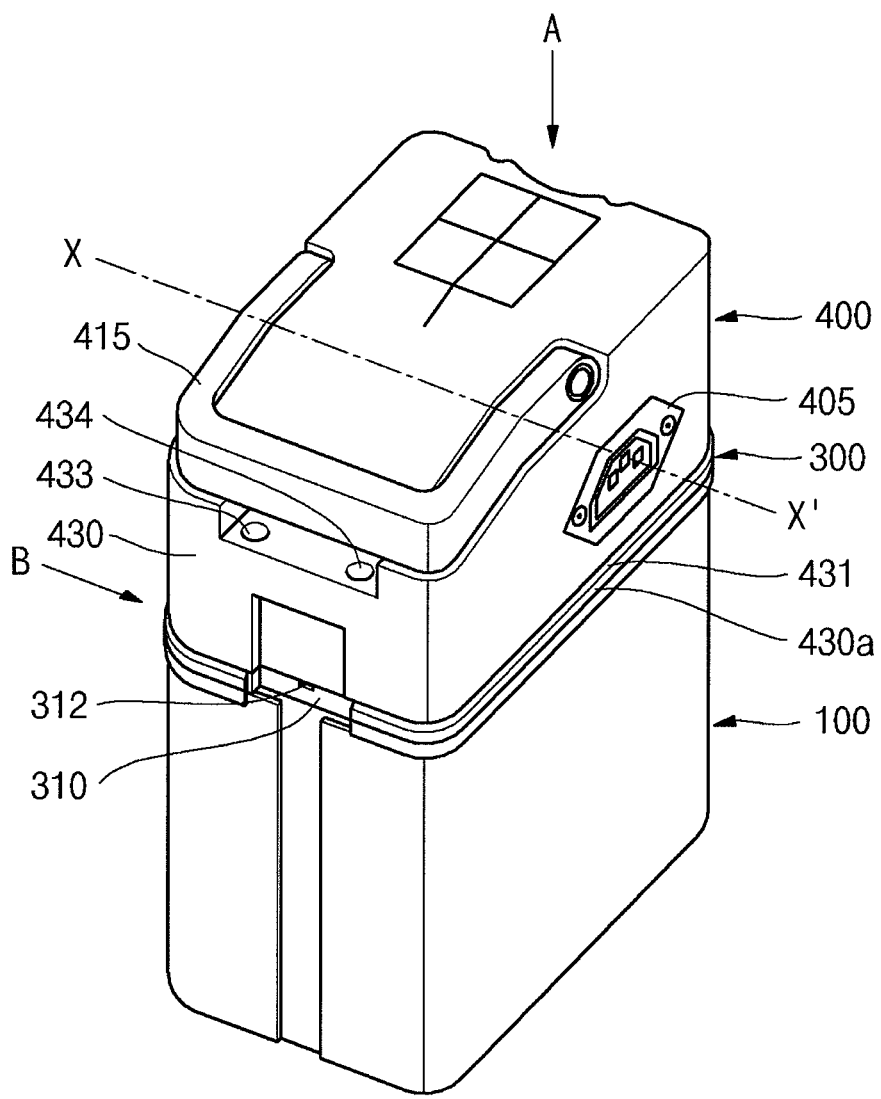
FIG. 1 illustrates a perspective view of a battery pack according to an embodiment.
Figure 2:
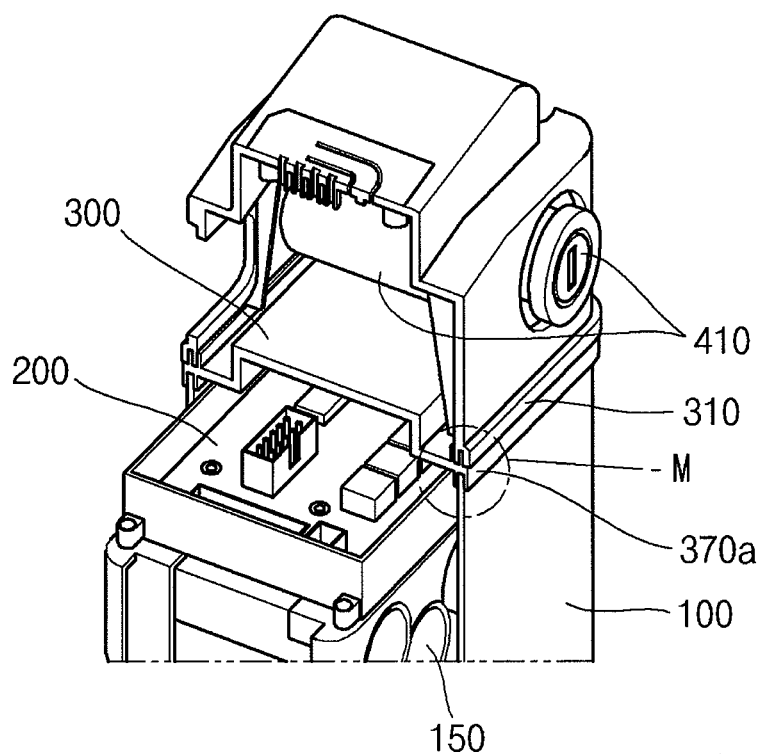
FIG. 2 illustrates a perspective view showing a section taken along line X-X' of FIG. 1 so that a surface viewed in direction B of FIG. 1 is shown.

FIG. 1 illustrates a perspective view of a battery pack according to an embodiment. FIG. 2 illustrates a perspective view showing a section taken along line X-X' of FIG. 1 so that a surface viewed in direction B of FIG. 1 is shown.

Referring to FIGS. 1 and 2, the battery pack includes a lower case 100, a battery cell 150 placed in the interior of the lower case 100, a protection circuit board 200 mounted on the top of the battery cell 150, a separator case 300 coupled to a top opening of the lower case 100 while covering the protection circuit board 200, and an upper case 400 coupled to an upper portion of the separator case 300.

Figure 3:
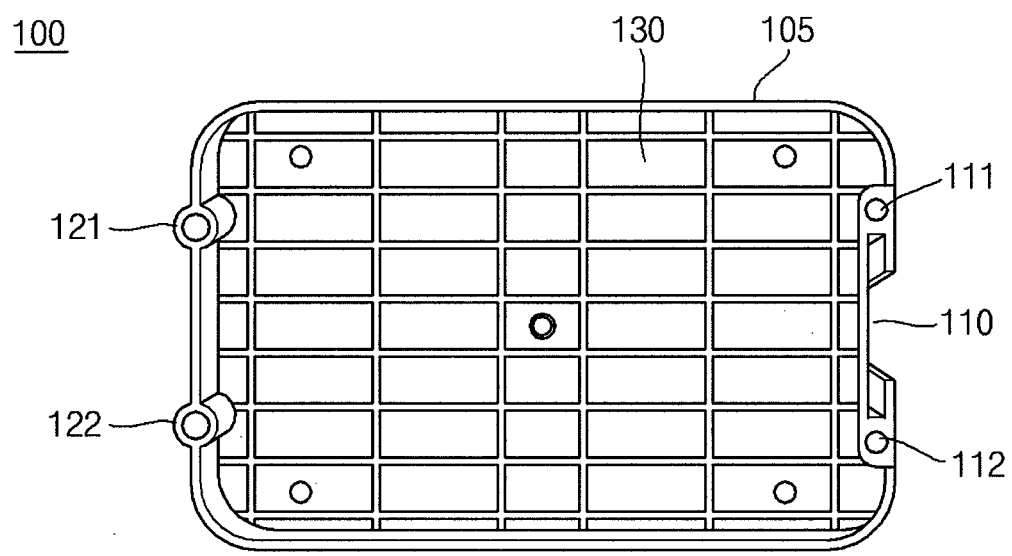
FIG. 3 illustrates a view of a lower case viewed in direction A of FIG. 1.

FIG. 3 illustrates a view of a lower case viewed in direction A of FIG. 1.

Referring to FIG. 3, the lower case 100 includes a lower case sidewall 105 and a lower case bottom 130.

In one embodiment, the lower case 100 has an opened top, and is generally made of a metallic material in an approximately rectangular shape. The lower case 100 may be made of aluminum to be light weight and possess anti-corrosion properties. Here, the material of the lower case 100 is not particularly limited, but any one may be used as the material of the lower case 100 as long as it is a material having hardness to an extent capable of protecting the battery cell 150 and the protection circuit board 200, placed in the lower case 100.

A battery attaching/detaching groove 110 is formed in a shape recessed in a center direction of the lower case 100 at one short side of the lower case sidewall 105. The battery attaching/detaching groove 110 functions to fix the battery pack to a bicycle.

In one embodiment, a first lower screw groove 111 and a second lower screw groove 112 are formed at the one short side of the lower case sidewall 105 to be spaced apart from each other. In this embodiment, a third lower screw groove 121 and a fourth lower screw groove 122 are formed at the other short side of the lower case sidewall 105 to be spaced apart from each other. The lower screw grooves 111, 112, 121 and 122 may be formed at the long sides of the lower case sidewall 105 to be spaced apart from each other.

The lower case bottom 130 functions to support the battery cell 150 inserted into the lower case 100 through the top opening of the lower case 100.

Figure 4:
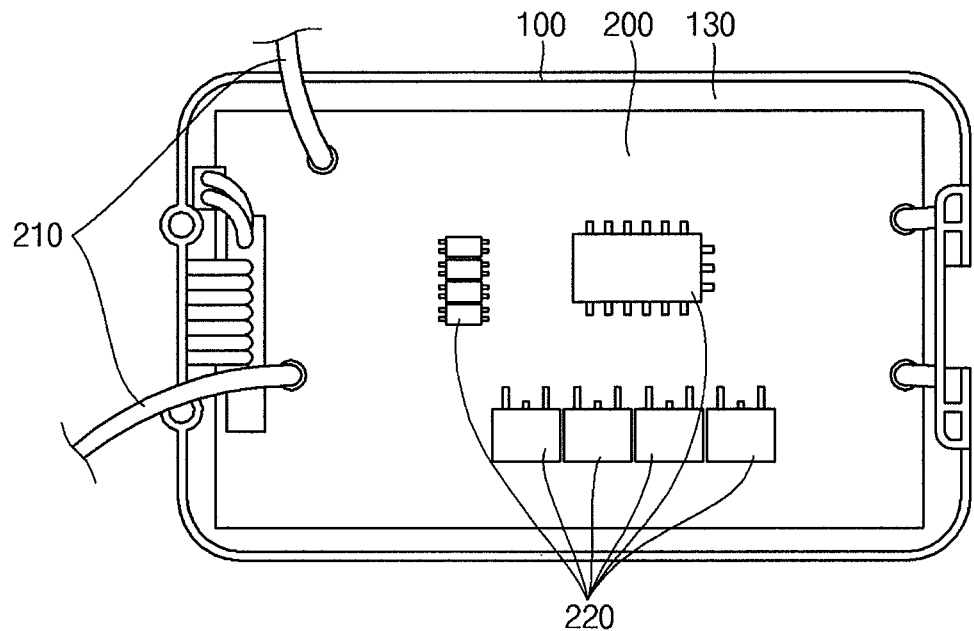
FIG. 4 illustrates a view showing a state that a protection circuit board mounted to the lower case of FIG. 3.

FIG. 4 illustrates the view after the battery cell 150 is inserted into the lower case, and the protection circuit board 200 has been mounted to the top of the battery cell 150, which is viewed in direction A of FIG. 1.

In one embodiment, the protection circuit board 200 has a wire pattern (not shown) formed in the interior thereof, and protection circuit elements 220 are mounted on the top of the protection circuit board 200.

Wires 210 electrically connected to the protection circuit elements 220 extend from the top of the protection circuit board 200. The protection circuit elements 220 are mounted on the top of the protection circuit board 200 to control charging/discharging of the battery cell 150 electrically connected to the protection circuit board 200. The wires 210 are electrically connected to an outlet 405 attached to the upper case 400 (FIG. 1).

Figure 5:
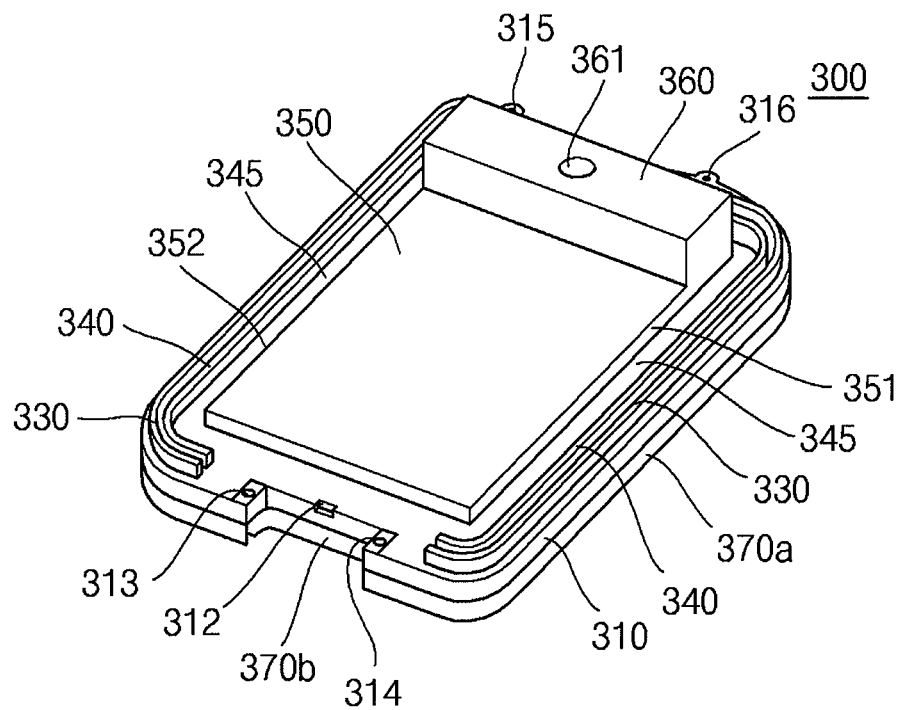
FIG. 5 illustrates a perspective view showing a top of a separator case according to an embodiment.
Figure 6:
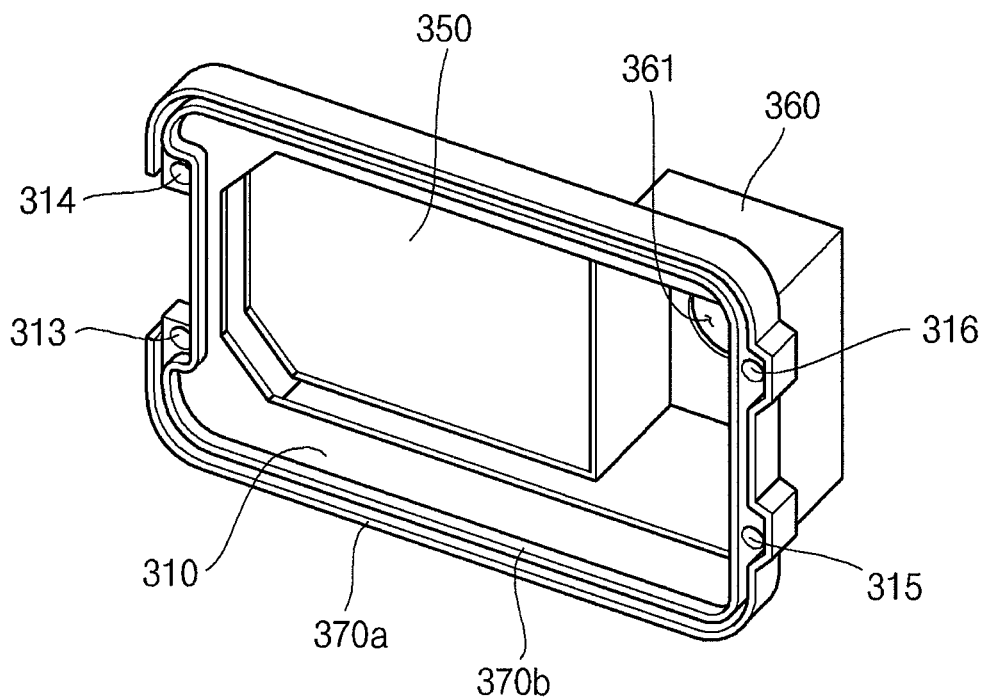
FIG. 6 illustrates a perspective view showing a bottom of the separator case according to an embodiment.
Figure 7:
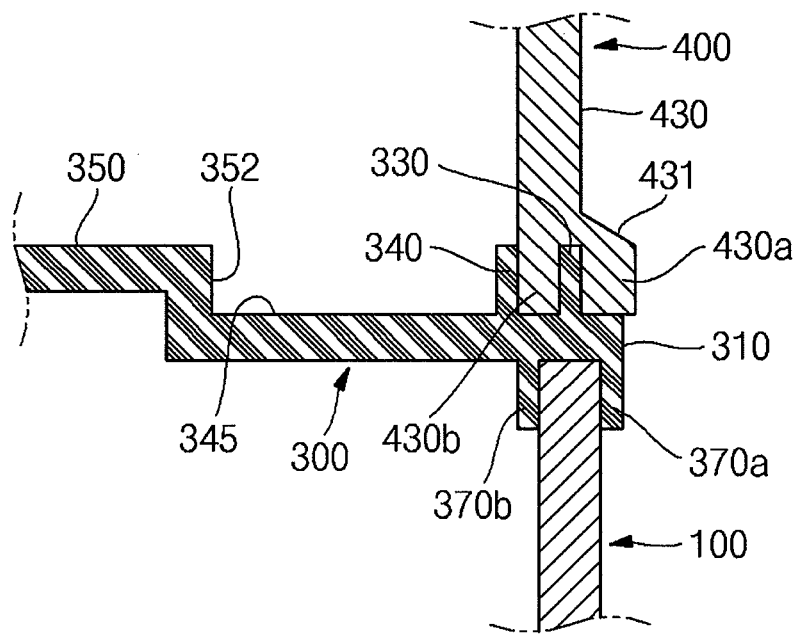
FIG. 7 illustrates an enlarged view of region M of FIG. 2.

FIG. 5 illustrates a perspective view showing a top of the separator case in the battery pack according to an embodiment. FIG. 6 illustrates a perspective view showing a bottom of the separator case according to an embodiment. FIG. 7 illustrates an enlarged view of region M of FIG. 2.

Referring to FIGS. 5 to 7, the separator case 300 is formed between the protection circuit board 200 and the upper case 400. For example, the separator case 300 is formed between the top opening of the lower case 100 and the upper case 400. The separator case 300 may include a separator 310 interposed between the protection circuit board 200 and the upper case 400, and a waterproof layer 330 and a first reinforcing waterproof layer 340, formed on the top of the separator 310. The separator case 300 may also include a separator extending portion 370a which extends in the direction of the lower case 100 from the separator 310, and a second reinforcing waterproof layer 370b formed on the bottom of the separator 310.

The separator case 300 may be formed at least partially of an elastic material such as plastic or rubber. In one embodiment, the separator case 300 is formed of the material having elasticity so as to minimize any gaps produced at a part at which it is connected to the lower and upper cases 100 and 400. The material of the separator case 300 is not particularly limited, but any material may be used as the material of the separator case 300 as long as it is a material having elasticity.

The separator 310 is formed at a position substantially corresponding to the top opening of the lower case 100 to have a shape and a size, substantially corresponding to those of the top opening of the lower case 100. The separator 310 is interposed between the protection circuit board 200 and the upper case 400 to substantially prevent water from penetrating into the interior of the upper case 400 and flowing toward and contacting the protection circuit board 200 placed in the interior of the lower case 100.

A discharge groove 312 having an approximately rectangular shape to enter in the center direction of the separator case 300 is formed at a portion corresponding to the battery attaching/detaching groove 110 formed at the lower case 100 in the separator 310, i.e., at a center top of the one short side of the separator 310. depending one the embodiment, the discharge groove 312 may have alternative shapes such as a triangular, circular, or other polygon. The discharge groove 312 is formed at the top of the separator 310. Since surfaces of the discharge groove 312 are all closed, water penetrating from the top of the separator 310 is discharged to the exterior of the battery pack through the discharge groove 312.

First and second separator screw holes 313 and 314 that pass in the thickness direction of the separator 310 are formed at the one short side of the separator 310 and are spaced apart from each other. The first and second separator screw holes 313 and 314 are formed at positions substantially corresponding to the first and second lower screw grooves 111 and 112 formed in the lower case 100 to have shapes and sizes substantially corresponding to those of the first and second lower screw grooves 111 and 112 formed in the lower case 100, respectively. Third and fourth separator screw holes 315 and 316 that pass in the thickness direction of the separator 310 are formed at the other short side and are spaced apart from each other. The third and fourth separator screw holes 315 and 316 are formed at positions substantially corresponding to the third and fourth lower screw holes 121 and 122 formed at the lower case 100 to have shapes and sizes substantially corresponding to those of the third and fourth lower screw holes 121 and 122 formed in the lower case 100, respectively.

A first stepped portion 350 is formed on the top of the separator 310 to be higher than the top of the separator 310. As shown in FIG. 5, the first stepped portion 350 is formed inwardly from the waterproof layer 330 and the first reinforcing waterproof layer 340 is formed along a long side on the top of the separator 310. In one embodiment, a lower portion of the first stepped portion 350 has a structure provided with an empty space in which the wires 210 extending from the protection circuit board 200 can be placed.

A second stepped portion 360 is formed at the end of the other short side of the first stepped portion 350 to be higher than the top of the first stepped portion 350. In one embodiment, a lower portion of the second stepped portion 360 has a structure provided with a space in which the wires 210 extending from the protection circuit board 200 can be placed.

A hole 361 is formed in the top of the second stepped portion 360. The hole 361 serves as a passage through which the wires 210 can be electrically connected to the outlet 405 attached to the upper case 400 by passing through the second stepped portion 360 from the bottom to top of the second stepped portion 360.

A separator extending portion 370a formed to extend in the direction of the lower case 100 from the separator 310 is formed in the entire portion except a portion substantially corresponding to the battery attaching/detaching groove 110 formed at the lower case 100 in the outer circumference of the bottom of the separator 310. In a case where the lower case 100 is coupled to the separator case 300, the separator extending portion 370a is formed outwardly from the outer surface of the lower case sidewall 105 (See FIG. 6). Thus, the separator extending portion 370a can substantially prevent water from penetrating between the lower case 100 and the separator case 300. The separator extending portion 370a forms a step difference with the outer surface of the lower case sidewall 105 due to the thickness thereof. Thus, it is possible to substantially prevent water flowing from the top of the battery pack from penetrating into a gap between the inner surface of the separator extending portion 370a and the outer surface of the lower case sidewall 105.

The second reinforcing waterproof layer 370b formed inwardly from the separator extending portion 370a is formed on the bottom of the separator 310. In one embodiment, the second reinforcing waterproof layer 370b is formed inwardly from the separator extending portion 370a by the thickness of the lower case sidewall 105. Thus, the lower case sidewall 105 is inserted between the separator extending portion 370a and the second reinforcing waterproof layer 370b, so that the lower case 100 and the separator case 300 are coupled to each other.

The waterproof layer 330 formed on the top of the separator 310 is formed in the entire portion except a portion substantially corresponding to the battery attaching/detaching groove 110 formed at the lower case 100 in the outer circumference of the top of the separator 310. The waterproof layer 330 is formed inwardly on a corner of the top of the separator 310. The waterproof layer 330 functions to substantially prevent water from penetrating between the separator case 300 and the upper case 400.

The first reinforcing waterproof layer 340 may be further formed inwardly from the waterproof layer 330 on the top of the separator 310. In one embodiment, the distance between the waterproof layer 330 and the first reinforcing waterproof layer 340 is substantially identical to the thickness of an outer wall 430b of the upper case 400, so that the outer wall 430b is tightly interposed between the waterproof layer 330 and the first reinforcing waterproof layer 340. The first reinforcing waterproof layer 340 functions to substantially prevent water from penetrating to the top of the separator 310 even when the water has penetrated between the waterproof layer 330 and the separator case 300.

The first reinforcing waterproof layer 340 forms a discharge passage 345 between long sides 351 and 352 of the first stepped portion 350. In a case where water is penetrated up to the interior of the first reinforcing waterproof layer 340, the discharge passage 345 allows the water to flow to the side at which the discharge groove 312 is formed, so that the water can be smoothly discharged.

Figure 8:
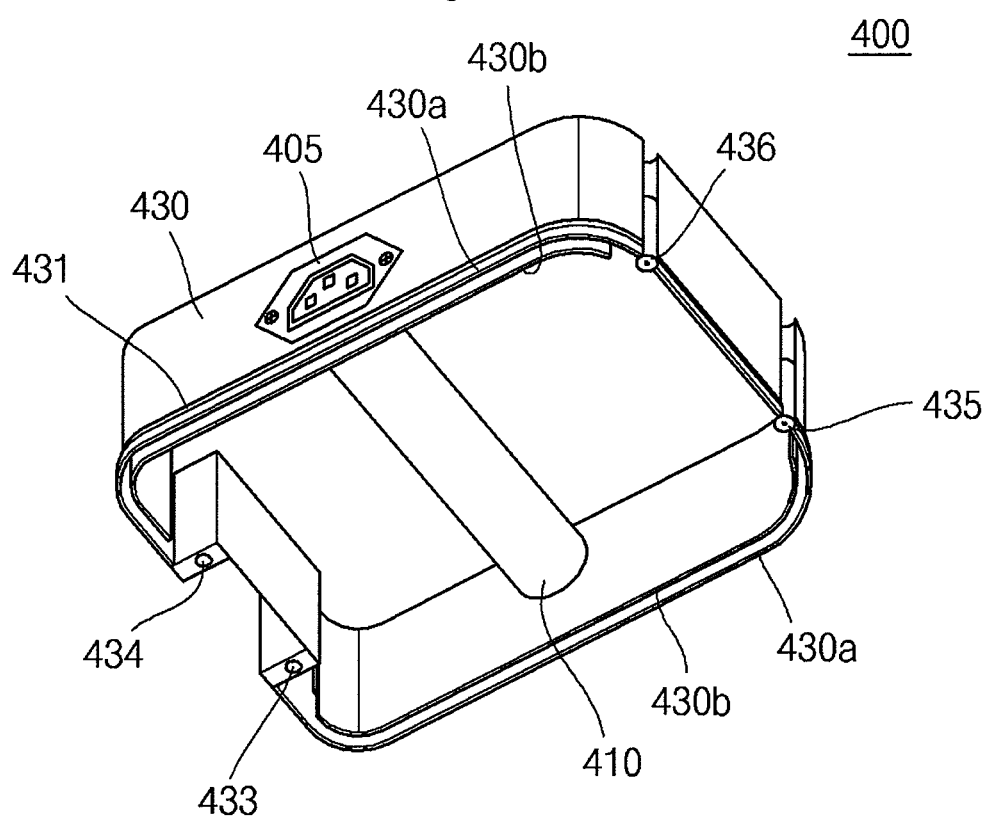
FIG. 8 illustrates a perspective view showing a bottom of an upper case according to an embodiment.

FIG. 8 illustrates a perspective view showing a bottom of the upper case 400 in the battery pack according to an embodiment.

Referring to FIG. 8, the upper case 400 includes a first outer wall (or a first sidewall) 430, a handle 415 (see FIG. 1) formed at an upper portion of the upper case 400, an outlet 405 formed on one long side of the upper case 400, and a key box 410 formed at the other long side of the upper case 400 to be electrically connected to the outlet 405 through the interior of the upper case 400.

In one embodiment, the upper case 400 has an open bottom, and is formed at a position substantially corresponding to the top of the separator 310 to have a size and a shape, substantially corresponding to those of the top of the separator 310. The upper case 400 is generally a case made of a metallic material, and may be made of aluminum to be light weight and possess anti-corrosion properties. Here, the material of the upper case 400 is not particularly limited.

The lower portion of the first outer wall 430 is configured as a second outer wall (or a second sidewall) 430a and a third outer wall (or a third sidewall) 430b formed inwardly from the second outer wall 430a. In one embodiment, the distance between the second and third outer walls 430a and 430b is substantially identical to the thickness of the waterproof layer 330 formed on the top of the separator 310.

The waterproof layer 330 formed on the top of the separator 310 is inserted between the second and third outer walls 430a and 430b, so that the upper case 400 and the separator case 300 are coupled to each other.

The first reinforcing waterproof layer 340 may further be formed to adhere closely to the inner surface of the third outer wall 430b. In this instance, the third outer wall 430b is inserted between the waterproof layer 330 and the first reinforcing waterproof layer 340, so that it increases the waterproof effect between the upper case 400 and the separator case 300. The outer surface of the second outer wall 430a is formed to protrude outwardly from the outer surface of the first outer wall 430. Thus, an inclined surface 431 is formed on an outer wall surface connected from the first outer wall 430 to the second outer wall 430a. The outer surface of the second outer wall 430a is formed outwardly from the outer surface of the separator 310. Thus, a step difference (or a raised portion) is formed at the boundary between the outer surface of the second outer wall 430a and the outer surface of the separator 310. The battery pack according to an embodiment can have excellent waterproof performance thanks to the structure having the inclined surface 431 and the stepped structure formed by the separator 310 and the second outer wall 430a protruded outward from the separator 310. That is, water flowed down in the direction of the separator case 300 from the upper case 400 is not penetrated into the gap between the upper case 400 and the separator case 300 but flowed down in the direction of the lower case 100 along the outer surface of the separator 310.

A first upper screw hole 433 is formed at a position substantially corresponding to the first separator screw hole 313 to have a shape and a size, substantially corresponding to those of the first separator screw hole 313, on one short side of the upper case 400, and a second upper screw hole 434 is formed at a position substantially corresponding to the second separator screw hole 314 to have a shape and a size, substantially corresponding to those of the second separator screw hole 314, on the one short side of the upper case 400. A third upper screw hole 435 is formed at a position substantially corresponding to the third separator screw hole 315 to have a shape and a size, substantially corresponding to those of the third separator screw hole 315, on the other short side of the upper case 400, and a fourth upper screw hole 436 is formed at a position substantially corresponding to the fourth separator screw hole 316 to have a shape and a size, substantially corresponding to those of the fourth separator screw hole 316, on the other short side of the upper case 400. Screws are inserted into the upper screw holes 433, 434, 435 and 436 and then connected through the separator screw holes 313, 314, 315 formed in the separator 310 and the lower screw grooves 111, 112, 121 and 122 of the lower case 100, respectively. Thus, the upper case 400, the separator case 300 and the lower case 100 can be firmly fixed to one another.

At least one of the disclosed embodiments provides a structure which prevents water from penetrating between cases and enables the water to be easily discharged to the exterior of the battery pack when the water penetrates into the interior of the battery pack, thereby sufficiently waterproofing the battery pack.

Embodiments have been disclosed herein with reference to the accompanying drawings, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the following claims.

What is claimed is:

1. A battery pack comprising:
   a lower case having a top, a bottom and an interior space formed between the top and bottom;
   a battery cell placed in the interior space of the lower case;
   a protection circuit board formed over the battery cell and placed in the interior space of the lower case;
   an upper case formed over the top of the lower case; and
   a separator case formed between the protection circuit board and the upper case, wherein at least a portion of the separator case is exposed to the environment, wherein a groove is formed at a bottom of the upper case, and wherein the separator case includes a water proof layer extending upwardly therefrom and inserted into the groove.

2. The battery pack as claimed in claim 1, wherein the separator case comprises i) a separator configured to separate the lower and upper cases from each other, wherein the separator has first and second surfaces opposing each other, and wherein the first surface of the separator is closer to the bottom of the lower case than the second surface of the separator, ii) the waterproof layer extending from the second surface of the separator toward the upper case, and iii) a separator extending portion extending from the first surface of the separator toward the lower case.

3. The battery pack as claimed in claim 2, wherein the separator case has a center portion, wherein the separator further comprises a first reinforcing waterproof layer extending from the second surface of the separator toward the upper case, and wherein the first reinforcing waterproof layer is closer to the center portion of the separator case than the waterproof layer.

4. The battery pack as claimed in claim 3, wherein the upper case has a sidewall, wherein a portion of the sidewall is interposed between the waterproof layer and the first reinforcing layer.

5. The battery pack as claimed in claim 2, further comprising a second reinforcing waterproof layer extending from the first surface of the separator toward the lower case.

6. The battery pack as claimed in claim 5, wherein the lower case has a sidewall, wherein the sidewall of the lower case is interposed between the separator extending portion and the second reinforcing waterproof layer.

7. The battery pack as claimed in claim 2, wherein the separator has two short sides and two long sides, wherein the upper case has a top and a bottom which is closer to the lower case than the top of the upper case, and wherein a discharge groove is formed at one of the short sides of the separator.

8. The battery pack as claimed in claim 7, further comprising a first stepped portion which is closer to the top of the upper case than the second surface of the separator and is formed along at least one of the long sides of the separator.

9. The battery pack as claimed in claim 8, further comprising a second stepped portion which is closer to the top of the upper case than the first stepped portion and is formed at the short side of the separator.

10. The battery pack as claimed in claim 9, wherein each of the first and second stepped portions has a top and a bottom which is farther from the upper case than the top of each of the stepped portions, and wherein an empty space is formed on the bottoms of the first and second stepped portions.

11. The battery pack as claimed in claim 9, wherein each of the first and second stepped portions has a top and a bottom which is farther from the upper case than the top of each of the stepped portions, and wherein a hole is formed in the top of the second stepped portion.

12. The battery pack as claimed in claim 8, wherein the first stepped portion has two short sides and two long sides, and wherein a discharge passage formed between the first reinforcing waterproof layer and at least one of the long sides of the first stepped portion.

13. The battery pack as claimed in claim 1, wherein the upper case comprises i) a first sidewall and ii) second and third sidewalls formed at a lower portion of the first side wall.

14. The battery pack as claimed in claim 13, wherein an outer surface of the second sidewall protrudes outwardly and downwardly from an outer surface of the first sidewall so that the protruding portion is inclined with respect to the first sidewall.

15. The battery pack as claimed in claim 13, wherein the separator case comprises a separator configured to separate the lower and upper cases from each other, and wherein an outer surface of the second sidewall protrudes outwardly from an outer surface of the separator.

16. The battery pack as claimed in claim 15, wherein the second and third sidewalls contact the separator.

17. The battery pack as claimed in claim 1, wherein the separator case is formed at least partially of an elastic material.

* * * * *